United States Patent
Han et al.

(10) Patent No.: US 11,196,842 B2
(45) Date of Patent: Dec. 7, 2021

(54) COLLABORATIVE AND EDGE-ENHANCED AUGMENTED REALITY SYSTEMS

(71) Applicants: AT&T Intellectual Property I, L.P., Atlanta, GA (US); The Hong Kong University of Science and Technology, Kowloon (HK)

(72) Inventors: Bo Han, Bridgewater, NJ (US); Wenxiao Zhang, Kowloon (HK); Pan Hui, Kowloon (HK); Vijay Gopalakrishnan, Edison, NJ (US); Cheuk Yiu Ip, Metuchen, NJ (US)

(73) Assignees: AT&T INTELLECTUAL PROPERTY I, L.P., Atlanta, GA (US); THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 0 days.

(21) Appl. No.: 16/584,814

(22) Filed: Sep. 26, 2019

(65) Prior Publication Data
US 2021/0099547 A1    Apr. 1, 2021

(51) Int. Cl.
*G06K 9/46* (2006.01)
*H04L 29/08* (2006.01)
(Continued)

(52) U.S. Cl.
CPC .......... *H04L 67/38* (2013.01); *G06K 9/00671* (2013.01); *H04L 67/1023* (2013.01); *H04L 67/2842* (2013.01); *H04W 4/021* (2013.01)

(58) Field of Classification Search
CPC .................... H04W 4/021; G06K 9/00671
See application file for complete search history.

(56) References Cited

U.S. PATENT DOCUMENTS

| 7,889,193 B2 | 2/2011 | Platonov et al. |
| 8,791,960 B2 | 7/2014 | Yoon et al. |

(Continued)

FOREIGN PATENT DOCUMENTS

| CN | 106875478 A | 6/2017 |
| WO | 2011149159 A1 | 12/2011 |
| WO | 2017210822 A1 | 12/2017 |

OTHER PUBLICATIONS

Vacchetti, L. & Lepetit, V. & Fua, P, "Combining edge and texture information for real-time accurate 3D camera tracking", ISMAR 2004: Proceedings of the Third IEEE and ACM International Symposium on Mixed and Augmented Reality, (2004), pp. 48-56, doi:10.1109/ISMAR.2004.24, https://www.researchgate.net/publication/4118059_Combining_Edge_and_Texture_Information_for_Real-Time_Accurate_3D_Camera_Tracking.

(Continued)

*Primary Examiner* — Samantha (Yuehan) Wang (57) ABSTRACT

In one example, a processing system of a mobile computing device including at least one processor may capture visual information of a first location, transmit a recognition request to a first server, the recognition request comprising the visual information, obtain a first recognition result from the first server comprising first annotation content associated with a first item in the visual information of the first location, the first recognition result further comprising visual information of the first item, present at least a portion of first annotation content via the mobile computing device, store the first annotation content and the visual information of the first item in a local cache, detect a first additional mobile computing device via a non-cellular wireless communication modality, and share the first annotation content and the (Continued)

100 visual information of the first item with the first additional mobile computing device via the non-cellular wireless communication modality.

20 Claims, 4 Drawing Sheets (51) Int. Cl.
*H04L 29/06* (2006.01)
*G06K 9/00* (2006.01)
*H04W 4/021* (2018.01)

(56) References Cited

U.S. PATENT DOCUMENTS

| | | | |
|---|---|---|---|
| 8,810,598 | B2 | 8/2014 | Soon-Shiong |
| 8,890,896 | B1 | 11/2014 | Tseng |
| 8,913,792 | B2 | 12/2014 | BenHimane et al. |
| 9,256,806 | B2 | 2/2016 | Aller et al. |
| 9,349,191 | B2 | 5/2016 | Cho et al. |
| 9,613,462 | B2 | 4/2017 | Mullins |
| 9,633,447 | B2 | 4/2017 | Swaminathan et al. |
| 9,659,380 | B1 | 5/2017 | Castellani et al. |
| 9,761,059 | B2 | 9/2017 | Nistel et al. |
| 9,904,850 | B2 | 2/2018 | Wnuk et al. |
| 9,911,231 | B2 | 3/2018 | Subramanian et al. |
| 9,928,656 | B2 | 3/2018 | Jiang et al. |
| 9,990,759 | B2 | 6/2018 | Mullins |
| 10,055,894 | B2 | 8/2018 | Chowdhary et al. |
| 2003/0012410 | A1 | 1/2003 | Navab et al. |
| 2010/0257252 | A1 | 10/2010 | Dougherty et al. |
| 2012/0306850 | A1 | 12/2012 | Balan et al. |
| 2014/0067679 | A1* | 3/2014 | O'Reilly .......... G06Q 20/40145 705/44 |
| 2014/0225924 | A1* | 8/2014 | Loxam ................. G06T 19/006 345/633 |
| 2015/0070347 | A1 | 3/2015 | Hofmann et al. |
| 2015/0269624 | A1* | 9/2015 | Cheng ................ G06Q 30/0267 705/14.58 |
| 2016/0350622 | A1 | 12/2016 | Sugaya |
| 2018/0114364 | A1 | 4/2018 | McPhee et al. |
| 2018/0261012 | A1 | 9/2018 | Mullins et al. |
| 2018/0330544 | A1 | 11/2018 | Corso et al. |
| 2019/0311513 | A1 | 10/2019 | Han et al. |
| 2020/0210704 | A1 | 7/2020 | Han et al. |

OTHER PUBLICATIONS

Papagiannakis, G. & Singh, G. & Magnenat-Thalmann, N, "A survey of mobile and wireless technologies for augmented reality systems", Comp. Anim. Virtual Worlds, (2008), pp. 3-22, doi:10.1002/cav.221, https://calhoun.nps.edu/bitstream/handle/10945/41253/Singh_d912f5075af50e0812_2008.pdf;jsessionid=7AADB16A1D46AE5B2597A372DF9FCC12?sequence=1.

Oh, S. & Woo, W., "CAMAR: Context-aware mobile Augmented Reality in smart space", Proceedings of IWUVR (2009), pp. 48-51, https://pdfs.semanticscholar.org/da46/dab2a30dad94a27ffe77068c0ea9efd4c250.pdf.

Van Krevelen, D.W.F. & Poelman, R, "A survey of augmented reality technologies, applications and limitations. Int. J. Virtual Reality", (2010), pp. 1-21, https://www.researchgate.net/profile/Rick_Van_Krevelen2/publication/279867852_A_Survey_of_Augmented_Reality_Technologies_Applications_and_Limitations/links/58dab7f445851578dfcac285/A-Survey-of-Augmented-Reality-Technologies-Applications-and-Limitations.pdf.

Karlekar, J. & Zhou, S. & Lu, W. & Zhi, C.L. & Nakayama, Y. & Hii, D, "Positioning, tracking and mapping for outdoor augmentation", (2010), pp. 175-184, doi: 10.1109/ISMAR.2010.5643567, https://www.computer.org/csdl/proceedings/ismar/2010/9343/00/05643567.pdf.

Rambach, J. & Pagani, A. & Schneider, M. & Artemenko, O. & Stricker, D, "6DoF Object Tracking based on 3D scans for Augmented Reality Remote Live Support", pp. 1-22, Computers 2018, doi: 10.3390/computers7010006, https://www.mdpi.com/2073-431X/7/1/6.

Wenxiao Zhang, et al., "Jaguar: Low Latency Mobile Augmented Reality with Flexible Tracking", Oct. 22, 2018, pp. 1-9, Session: FF-2 MM'18, , Seoul, Republic of Korea MM '18, Seoul, Republic of Korea Association for Computing Machinery, ACM ISBN 978-1-4503-5665-7/18/10, https://doi.org/10.1145/3240508.3240561.

Sample Code, "Swiftshot: Creating a Game for Augmented Reality", pp. 1-5, https://https://developer.apple.com/documentation/arkit/swiftshot_creating_a_game_for_augmented_reality.

* cited by examiner

FIG. 4

COLLABORATIVE AND EDGE-ENHANCED AUGMENTED REALITY SYSTEMS

The present disclosure relates generally to augmented reality experiences, and more particularly to devices, non-transitory computer-readable media, and methods for obtaining, by a mobile computing device, annotation content and visual information associated with a first item detected in visual information of a first location from a first server and sharing the annotation content and visual information of the first item with an additional mobile computing device, and to devices, non-transitory computer-readable media, and methods for detecting an item in visual content of a first location and providing annotation content and visual information associated with the item to a mobile computing device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a device, computer-readable medium, and method for obtaining, by a mobile computing device, annotation content and visual information associated with a first item detected in visual information of a first location from a first server and sharing the annotation content and visual information of the first item with an additional mobile computing device. For instance, a processing system of a mobile computing device including at least one processor may capture visual information of a first location, transmit a recognition request to a first server, the recognition request comprising the visual information of the first location, and obtain a first recognition result from the first server, the first recognition result comprising first annotation content associated with a first item in the visual information of the first location, the first recognition result further comprising visual information of the first item, where the first item is detected in the visual information of the first location by the first server based upon the visual information of the first item. The processing system may then present at least a portion of first annotation content via the mobile computing device, store the first annotation content and the visual information of the first item in a local cache of the mobile computing device, detecting a first additional mobile computing device via a non-cellular wireless communication modality, and share the first annotation content and the visual information of the first item with the first additional mobile computing device via the non-cellular wireless communication modality.

In another example, the present disclosure describes an apparatus, computer-readable medium, and method for detecting an item in visual content of a first location and providing annotation content and visual information associated with the item to a mobile computing device. For instance, a processing system of a first server including at least one processor may obtain a first recognition request from a first mobile computing device, the first recognition request comprising visual information of a first location, apply a feature matching detection algorithm to the visual information of the first location in accordance with a cache of the processing system, where the cache contains entries comprising visual information of a plurality of items and associated annotation contents, and detect a first item of the plurality of items in the visual information of the first location via the feature matching detection algorithm in accordance with visual information of the first item contained in the cache. The processing system may then provide a first recognition result associated with the first item to the first mobile computing device, the first recognition result comprising the visual information of the first item and first annotation content that is associated with the first item.

Augmented reality (AR) is tied closely to the physical world, and users observing similar augmented scenes may generally be in the vicinity of each other (e.g., visiting the same museum). This physical proximity provides the opportunity for collaboration and interaction between users. However, mobile AR systems are generally designed to be used by an individual. Thus, the potential for cooperation and interaction among users running even the same AR application has been largely neglected. One of the challenges of enabling the sharing of AR experiences is to establish a common coordinate system among users. One overall approach utilizes relocalization of 3D point clouds. For example, mobile devices may model real-world objects by creating 3D point clouds from camera frames and then either exchange the 3D point clouds locally or send the 3D point clouds to cloud servers for relocalization. However, this process may be both time consuming (e.g., taking several seconds to finish) and bandwidth intensive. It may also waste computation resources in the cloud and increase mobile data usage of end-users.

To illustrate, a user may enter a room and request a room number from a first processing system (e.g., a server or other network-based processing system). The user's mobile computing device may then scan the environment and send visual information to a second (network-based) processing system. The second processing system may provide an identification (ID) of an anchor to the mobile computing device. The user may, via the mobile computing device, place the anchor in the environment, and then provide the ID and the location to the first processing system. Another user may then enter the room. To resolve the anchor, the mobile computing device of the second user may send the room number (which may be obtained from a side channel) to the first processing system to retrieve the anchor ID. The mobile computing device of the second user may then send the anchor ID along with visual feature descriptors of a current camera frame to the second processing system, which matches these feature descriptors to the generated sparse point cloud of hosted anchors. Finally, the second processing system may send back the detailed information of the anchor, e.g., the orientation and the position in the shared space, for rendering and display on the second user's mobile computing device. It should be noted that hosting and sharing of anchors takes a relatively longer amount of time (e.g., greater than 10 seconds in several experiments) and leads to more data usage than the exchanging of anchor IDs, due to the transmission of visual mapping data and feature descriptors and the computation-heavy processing on the second processing system. For example, for hosting an anchor, an AR application of the mobile computing device may potentially send multiple camera frames, along with data from motion sensors.

Another challenge of sharing AR experiences is to support multiple users (e.g., more than 20) concurrently without affecting the user-perceived quality of experience (QoE), and more particularly end-to-end latency. Although cloud offloading can reduce the latency, existing work has demonstrated that the server-side process time significantly increases when the number of simultaneous requests increases, as the compute resources are shared among users. The accumulated concurrent offloading of tasks may also cause queuing delay which further worsens the end-to-end latency.

The present disclosure provides a two-tier architecture using both local caching and edge caching. In particular, the present disclosure utilizes the social nature of human beings to provide a collaborative framework for sharing the results of compute-intensive AR tasks and high quality AR annotation content. In one example, the system may be referred to as a "Sharing Experiences in AR" (SEAR) system. By intelligently sharing information among users when and where feasible, SEAR reduces the end-to-end latency of AR experiences via a two-tier architecture that may utilize both edge caching and local caching. In the case that collaborative users are always within a few meters of each other (e.g., close friends), SEAR supports instantaneous socialization and interaction by synchronizing their changes to annotations (e.g., rotation and scaling) in real time.

In one example, a mobile computing device may periodically run neighbor discovery to find peers running the same AR application. In addition, the mobile computing device may exchange AR results with peers, e.g., visual information of items of interest that are detected in visual information of an environment and annotation content associated with the items (e.g., AR content comprising text, animations, video, sounds, tactile information, and so forth). When actually running an AR task on a mobile computing device, SEAR may first operate in an edge cache mode and send recognition requests to an edge server. If the load on the edge server is too high or the edge server is otherwise unavailable, SEAR may notify the client to operate in a local caching mode. In one example, when a cache miss happens for either the local caching mode or the edge caching mode, a recognition request may be sent to a centralized network-based server. In one example, recognition tasks may be efficiently scaled for mobile computing devices, e.g., by selecting a more lightweight feature extraction algorithm suitable for mobile computing devices as compared to a feature extraction algorithm that may be deployed at the edge server.

Thus, examples of the present disclosure provide for collaboration and interaction, and create an immersive user experience. At the application level, SEAR may also enable the exchange of information, for example regarding a surrounding environment during a fire hazard for first responders with a single-minded focus. At the system level, SEAR improves efficiency by reusing computation resources in the cloud, reducing end-to-end latency, and conserving mobile data usage. These and other aspects of the present disclosure are described in greater detail below in connection with the examples of FIGS. 1-4.

Figure 1:
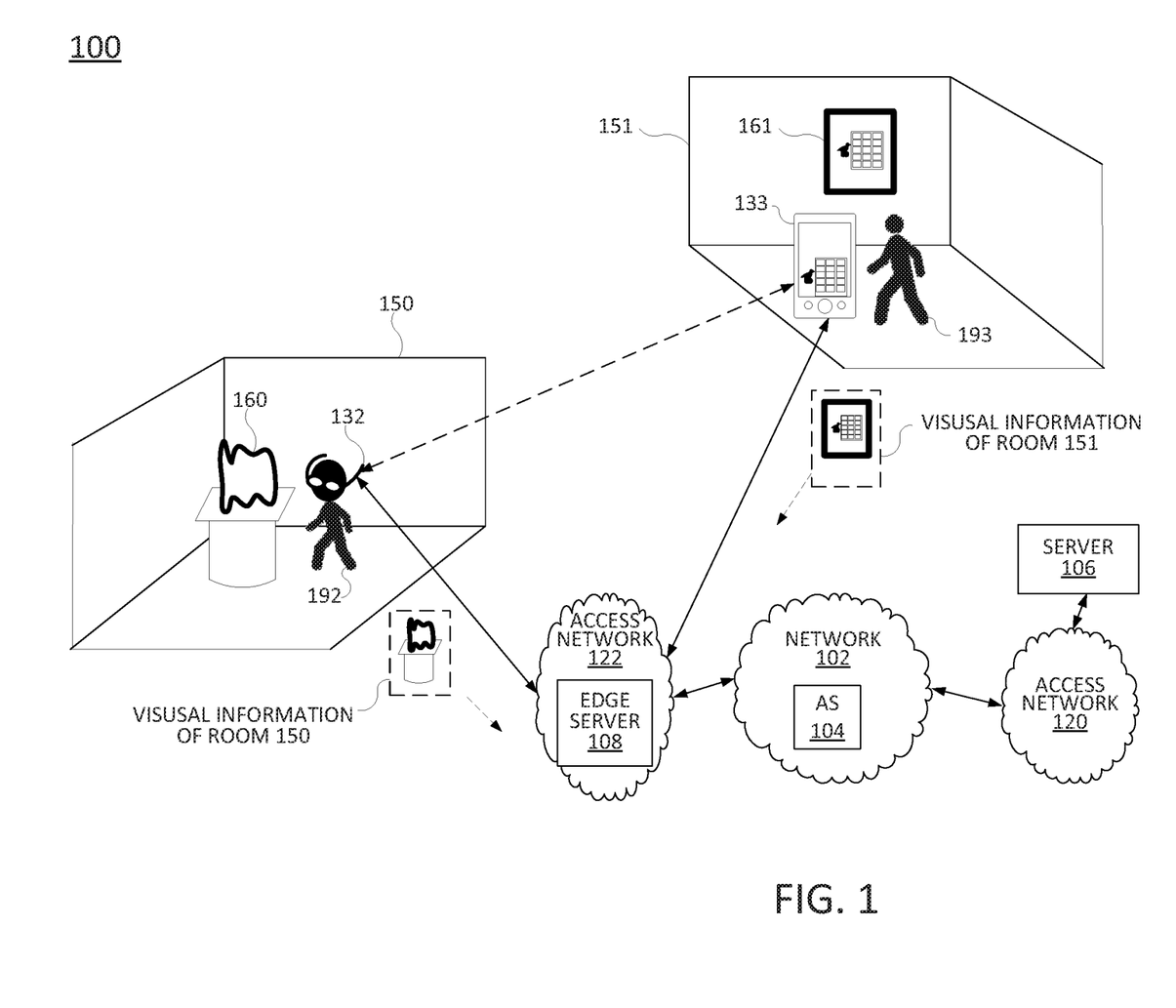
FIG. 1 illustrates an example network related to the present disclosure.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

Figure 4:
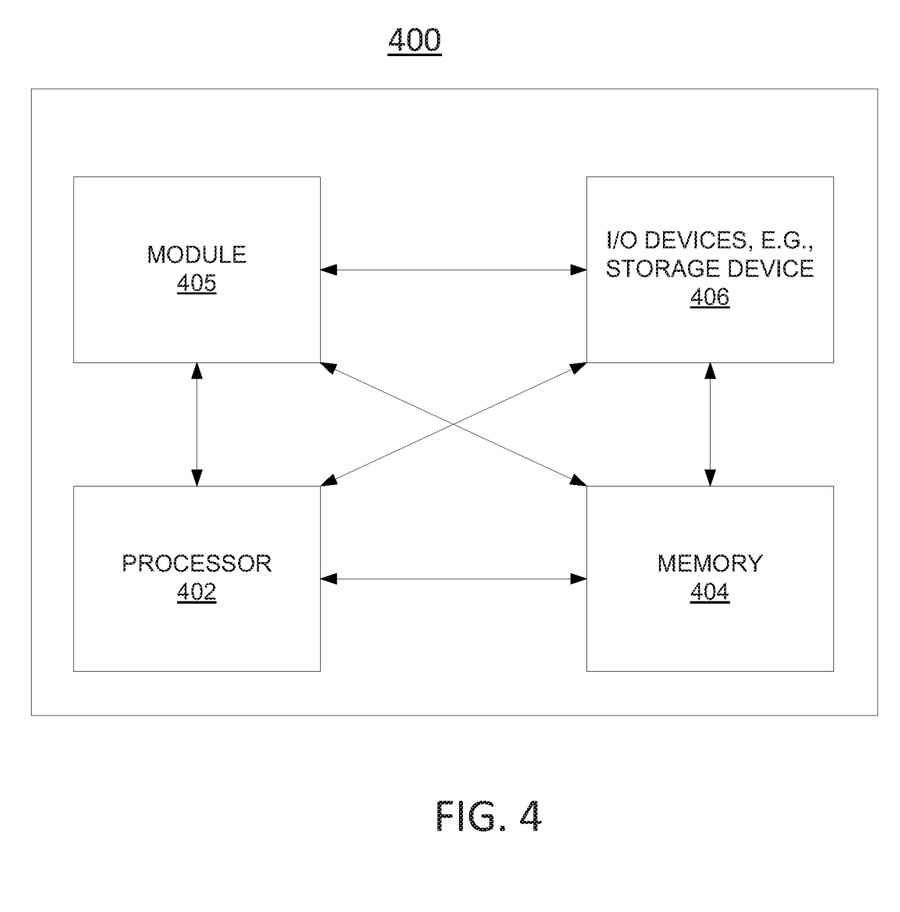
FIG. 4 illustrates a high level block diagram of a computing device specifically programmed to perform the steps, functions, blocks and/or operations described herein.

In accordance with the present disclosure, application server (AS) 104 may comprise a computing system or server, such as computing system 400 depicted in FIG. 4, and may be configured to provide one or more operations or functions in connection with examples of the present disclosure for obtaining by a mobile computing device annotation content and visual information associated with a first item detected in visual information of a first location from a first server and sharing the annotation content and visual information of the first item with an additional mobile computing device and/or for detecting an item in visual content of a first location and providing annotation content and visual information associated with the item to a mobile computing device, either or both of which may be referred to herein as a Sharing Experiences in AR (SEAR) system. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. Thus, although only a single application server (AS) 104 is illustrated, it should be noted that any number of servers may be deployed, and which may operate in a distributed and/or coordinated manner as a processing system to perform operations in connection with a SEAR system of the present disclosure.

In one example, AS 104 may comprise a centralized network-based server for an AR experience (e.g., a SEAR system). In one example, AS 104 may comprise a physical storage device (e.g., a database server), to store various types of information in connection with a SEAR system of the present disclosure. For example, AS 104 may store visual information of various items that may be detected in an environment associated with an AR experience as well as corresponding AR annotation content (e.g., including visual overlay information, which may comprise, text, images, video, audio, animations, graphics, etc., and which may additionally include audio content, haptic content, and so forth). The visual information of the various items may include images of the various items, and may alternatively or additionally include feature sets derived from one or more images of each of the one or more items, respectively. For instance, for each item of interest in an AR experience (e.g., in a SEAR system), AS 104 may store a respective scale-invariant feature transform (SIFT) model, or a similar reduced feature set derived from image(s) of the item, which may be used for detecting the item in other visual information via feature matching. For ease of illustration, various additional elements of network 102 are omitted from FIG. 1.

For illustrative purposes, the system 100 of FIG. 1 may be associated with a SEAR system for a museum comprising at least two rooms 150 and 151. As illustrated in FIG. 1, room 150 includes a sculpture 160, while room 151 includes a painting 161. In accordance with the present disclosure, the sculpture 160 may comprise a first item of interest in the SEAR system and the painting 161 may comprise a second item of interest. Accordingly, AS 104 may store visual information of the sculpture 160, e.g., in a record along with annotation content for the sculpture 160. Similarly, AS 104 may store visual information of the painting 161 in a record along with annotation content for the painting 161.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, 3$^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 3:
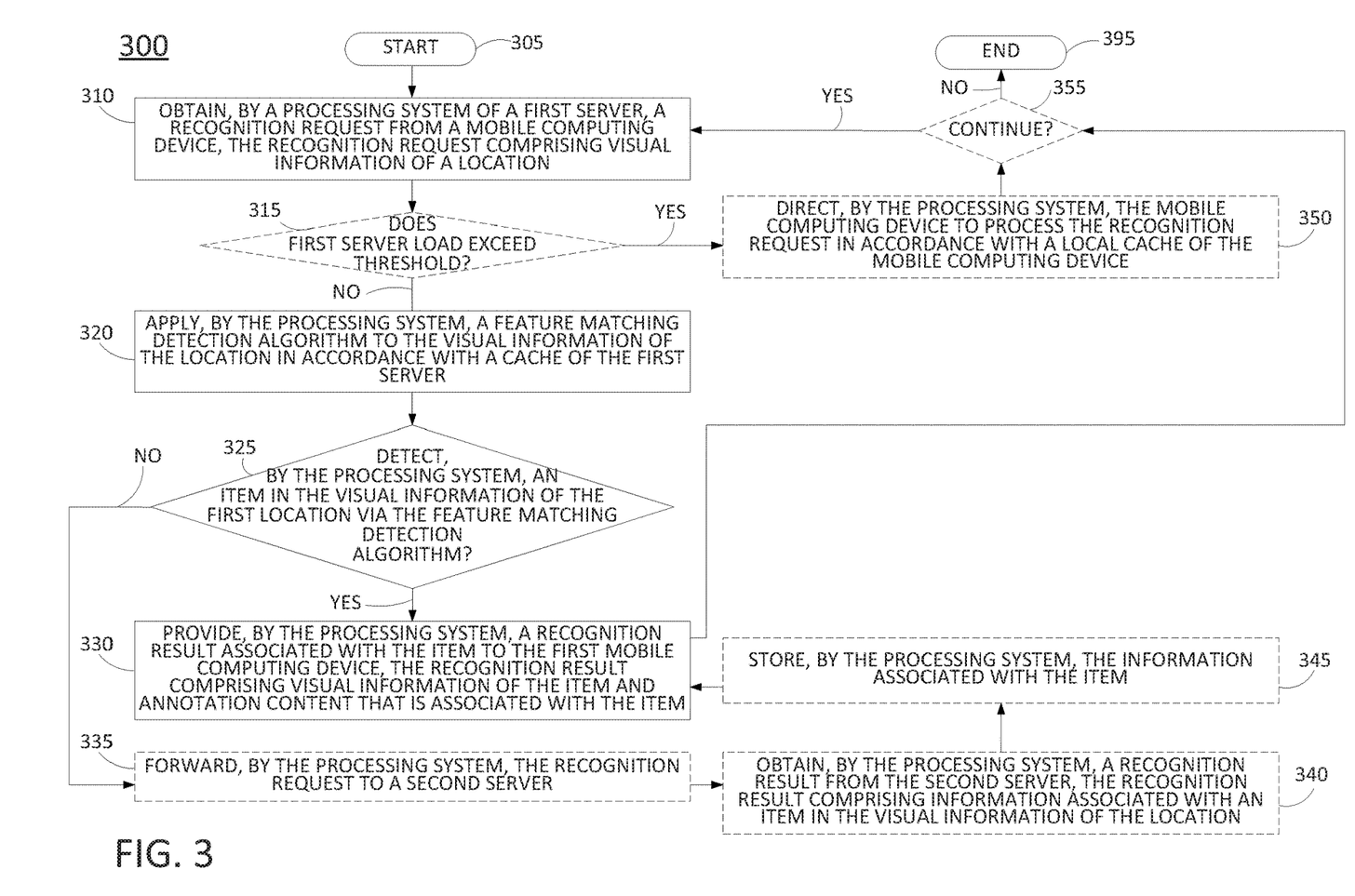
FIG. 3 illustrates a flowchart of an example method for detecting an item in visual content of a first location and providing annotation content and visual information associated with the item to a mobile computing device.

In one example, access network 122 may include an edge server 108, which may comprise a computing system or server, such as computing system 400 depicted in FIG. 4, and may be configured to provide one or more operations or functions for detecting an item in visual content of a first location and providing annotation content and visual information associated with the item to a mobile computing device, as described herein. For instance, an example, method 300 for detecting an item in visual content of a first location and providing annotation content and visual information associated with the item to a mobile computing device is illustrated in FIG. 3 and described in greater detail below. In one example, edge server 108 may comprise a component of a SEAR system. In one example, edge server 108 may store visual information of various items that may be detected in an environment associated with an AR experience as well as corresponding AR annotation content.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, a microservice, or the like.

Figure 2:
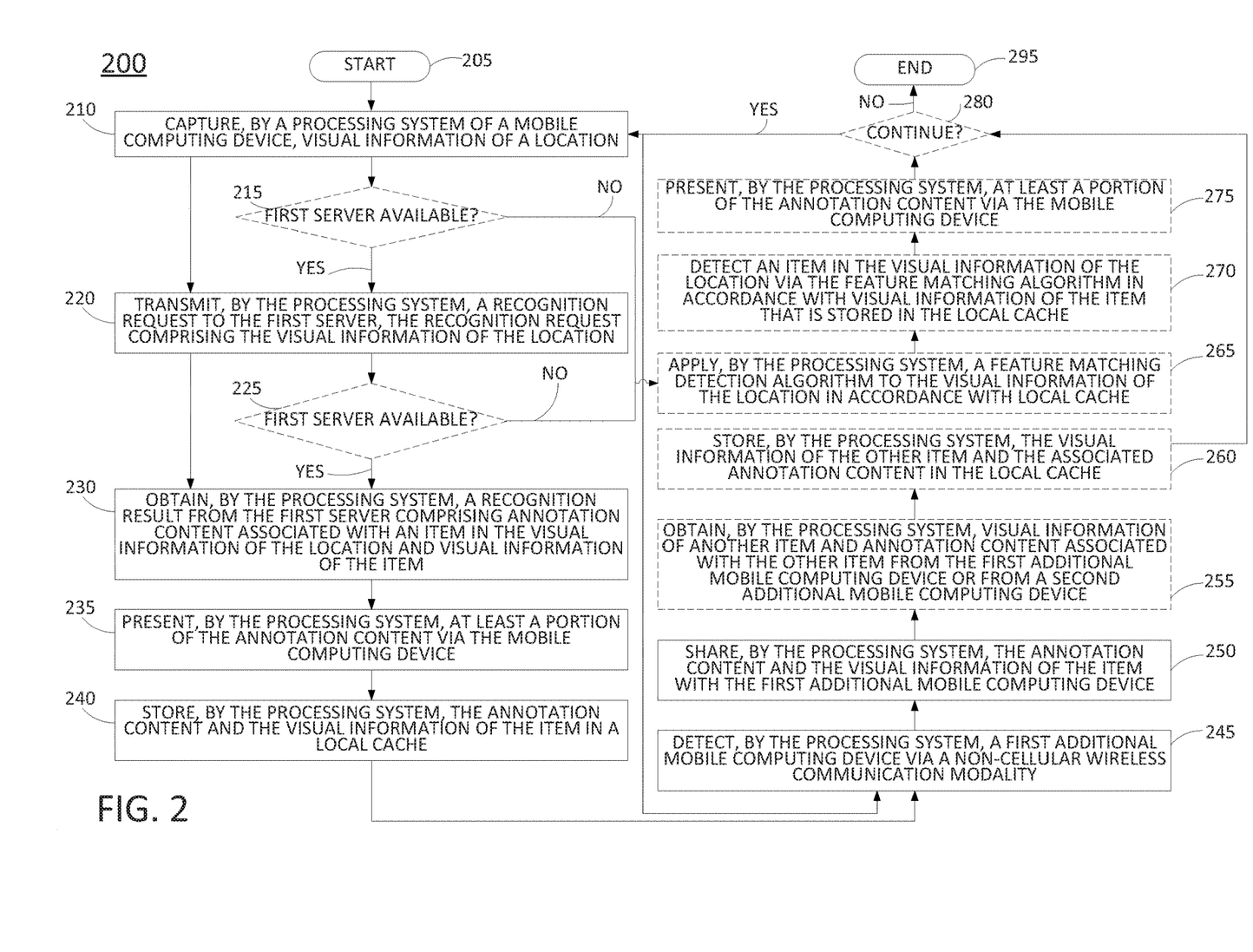
FIG. 2 illustrates a flowchart of an example method for obtaining by a mobile computing device annotation content and visual information associated with a first item detected in visual information of a first location from a first server and sharing the annotation content and visual information of the first item with an additional mobile computing device.

In one example, the access network 120 may be in communication with a server 106. Similarly, access network 122 may be in communication with one or more devices, e.g., devices 132 and 133. Access networks 120 and 122 may transmit and receive communications between server 106, devices 132 and 133, application server (AS) 104, other components of network 102, devices reachable via the Internet in general, and so forth. In one example, devices 132 and 133 may each comprise a mobile device, a cellular smart phone, a wearable computing device (e.g., smart glasses, a virtual reality (VR) headset, or the like), a laptop computer, a tablet computer, or the like (broadly a "mobile computing device"). In one example, devices 132 and 133 may each comprise a computing system or device, such as computing system 400 depicted in FIG. 4, and may be configured to provide one or more operations or functions for obtaining by a mobile computing device annotation content and visual information associated with a first item detected in visual information of a first location from a first server and sharing the annotation content and visual information of the first item with an additional mobile computing device, as described herein. An example method 200 for obtaining, by a mobile computing device, annotation content and visual information associated with a first item detected in visual information of a first location from a first server and sharing the annotation content and visual information of the first item with an additional mobile computing device is illustrated in FIG. 2 and described in greater detail below.

In one example, server 106 may comprise a centralized network-based server for a SEAR system. In this regard, server 106 may comprise the same or similar components as those of AS 104 and may provide the same or similar functions. Thus, any examples described herein with respect to AS 104 may similarly apply to server 106, and vice versa. In particular, server 106 may be a component of an illustrative SEAR system operated by an entity that is not a telecommunications network operator. For instance, a provider of a SEAR system may operate server 106 and may also operate edge sever 108 in accordance with an arrangement with a telecommunication service provider offering edge computing resources to third-parties. However, in another example, a telecommunication network service provider may operate network 102 and access network 122, and may also provide a SEAR system via AS 104 and edge server 108. For instance, in such an example, the SEAR system may comprise an additional service that may be offered to subscribers and/or that may be provided by the telecommunication network service provider to other entities, such as a museum, desiring to provide AR experiences to clients, customers, visitors, etc. without having to host or operate their own SEAR infrastructure.

In an illustrative example, a SEAR system for a museum comprising rooms 150 and 151 may be provided via AS 104 and edge server 108. In one example, users, such as users 192 and 193, desiring to engage in an AR experience provided by the SEAR system may engage an AR application on respective mobile computing devices (e.g., devices 132 and 133) to establish sessions with the AR system, e.g., connections to edge server 108 and to AS 104. As illustrated in FIG. 1, user 192 may be in the room 150 and may capture visual information of the room 150 via device 132 (e.g., images/frames via a camera of the device 132). The visual information may include imagery of the sculpture 160, for example. Device 132 may then transmit a recognition request to edge server 108 comprising the visual information captured via the device 132. In one example, device 132 may first communicate with edge server 108 to confirm the availability of edge server 108 to process the request.

In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between devices 132, 133, and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, devices 132 and 133 may communicate with access network 122, network 102, the Internet in general, etc., via a WLAN that interfaces with access network 122. For instance, the museum may provide a WLAN that provides network services to various users' mobile computing devices via access network 122.

In one example, edge server 108 may receive, process, and respond to recognition requests from mobile computing devices in connection with an AR experience. In the present example, edge server 108 may receive the recognition request from device 132 comprising the visual information of room 150, and may process the visual information in accordance with a cache comprising visual information of various items of interest via a feature matching detection algorithm. In one example, the feature matching detection algorithm may be based upon a SIFT model with a Gaussian mixture model (GMM)-based matching and detection. However, in other examples, different feature matching detection algorithms may be used, such as a Speeded Up Robust Features (SURF) algorithm, a cosine-matrix distance-based detector, a Laplacian-based detector, a Hessian matrix-based detector, a fast Hessian detector, etc. When a match is detected, the edge server 108 may provide visual information of the detected item (e.g., sculpture 160) and associated annotation content to the requesting device 132. For example, another user may have previously submitted a recognition request to edge server 108 relating to the item 160 and the edge server 108 may have previously obtained and stored visual information of sculpture 160 and associated annotation content from AS 104 in connection with the prior recognition request.

However, if there is no match in accordance with the feature matching detection algorithm, the edge server 108 may forward the recognition request to AS 104 (e.g., a centralized, network-based server). In such case, AS 104 may apply a similar feature matching detection algorithm to the visual information of the room 150 in accordance with a larger database of entries containing all items of interest in the SEAR system for the museum. When a match is detected, AS 104 may provide corresponding visual information of the detected item (sculpture 160) and the associated annotation content to the edge server 108. In turn, edge server 108 may provide the visual information of the sculpture 160 and the associated annotation content to the requesting device 132. In addition, edge server 108 may store the visual information of the sculpture 160 and the associated annotation content in its own cache. In this way, edge server 108 builds a cache relating to items that have been seen and experienced by various users of various mobile computing devices. Then, when other mobile computing devices submit recognition requests, the edge server 108 may have a corresponding entry that can be used to detect an item and provide the visual information of the detected item and the associated annotation content to the requesting device, without having to contact the centralized server (e.g., AS 104).

Upon receiving the visual information of the sculpture 160 and the associated annotation content, the device 132 may present the annotation content (or at least a portion thereof, e.g., depending upon the capabilities of device 132, the preferences/settings selected by user 192, etc.) via the device 132. For instance, device 132 may present a visual component of the annotation content via a projection and/or a visual overlay, and so forth. In one example, device 132 may also present the annotation content in an audio format via a speaker or a headset of the device 132 or of a paired device. Alternatively, or in addition, the processing system may present the information via one or more haptic feedback components of the device 132 or of a paired device. For instance, device 132 may be caused to shake, rumble, vibrate, etc. In addition, device 132 may store the visual information of sculpture 160 and the associated annotation content in a local cache of the device 132.

In a similar way, user 193 may be in room 151 of the museum and may capture visual information of the room 151 via a camera of device 133. The visual information of room 151 may include imagery of painting 161, for example. Device 133 may then transmit a recognition request to edge server 108 comprising the visual information of room 151 that is captured. Edge server 108 may apply the feature matching detection algorithm to the visual information of room 151 obtained from device 133 in accordance with the cache of edge server 108 comprising visual information of various items of interest. Upon a cache hit (e.g., a positive match from the cache), edge server 108 may provide visual information of the painting 161 and associated annotation content to device 133 as a "recognition result." Upon a cache miss, the edge server 108 may forward the recognition request to AS 104 and, assuming that AS 104 detects the painting 161 in the visual information, may obtain a response from AS 104 comprising visual information of the painting 161 and associated annotation content. Edge server 108 may then store the visual information of the painting 161 and associated annotation content in the cache of edge server 108, and also forward the visual information of the painting 161 and associated annotation content to device 133 as a "recognition result."

Upon receiving the visual information of the painting 161 and the associated annotation content, the device 133 may present the annotation content (or at least a portion thereof, e.g., depending upon the capabilities of device 133, the preferences/settings selected by user 193, etc.) via the device 133. For instance, the annotation content may comprise visual information (e.g., text, video, images, animations, or the like), which may be presented via a projection and/or a visual overlay by the device 133. Similarly, audio and/or haptic content of the annotation content (if present) may also be presented via device 133. In addition, device 133 may store the visual information of painting 161 and the associated annotation content in a local cache of the device 133.

In accordance with the present disclosure, mobile computing devices participating in an AR experience may be configured to share information regarding items of interest via local non-cellular wireless communications. For instance, devices 132 and 133 may detect each other within non-cellular wireless communication range, upon which the devices 132 and 133 may share any information regarding items of interest that may be stored in respective local caches of the devices 132 and 133. The devices 132 and 133 may detect other participating mobile computing devices and may exchange information regarding items of interest via one or more non-cellular wireless communication modalities, such as in accordance with a wireless local area network protocol (e.g., IEEE 802.11, Wi-Fi Direct, or the like), or a wireless peer-to-peer protocol (e.g., IEEE 802.15). In the present case, device 132 may provide visual information of sculpture 160 and the associated annotation content to device 133. Similarly, device 133 may provide visual information of painting 161 and the associated annotation content to device 132. Devices 132 and 133 may exchange information regarding other items of interest (e.g., other sculptures, paintings, etc. of the museum (not shown) for which device 132 and/or device 133 may have previously obtained visual information and associated annotation content). The devices 132 and 133 may then store the respective information regarding item(s) of interest that is/are received during the exchange.

Thereafter, user 192 may enter room 151 and may capture visual information of room 151 via device 132. However, for illustrative purposes, edge server 108 may be overloaded (e.g., a load of edge server 108 exceeds a designated threshold, such as 85 percent utilization of processor and/or memory resources, 90 percent utilization, etc.) or may be otherwise unavailable. For instance, device 132 may attempt to confirm the availability of edge server 108 and may receive a negative reply or may not receive a reply within a timeout time period. Alternatively, or in addition, device 132 may transmit a recognition request to edge server 108 and may receive a response declining to process the request or may not receive an acknowledgement within a designated timeout time period. In another example, edge server 108 may transmit an instruction to device 132 (and/or to device 133 or other devices, to enter a local caching mode). The instruction may be transmitted proactively upon the edge server 108 detecting that the load has exceeded or is anticipated to exceed the load threshold. In another example, the instruction may be transmitted in response to a submission of a recognition request or in response to an inquiry to confirm availability of the edge server 108.

In any case, any of the above conditions may cause device 132 to enter a local caching mode. For instance, device 132 may then attempt to apply a feature matching detection algorithm to the captured visual information of the room 151 in accordance with the local cache of device 132. In one example, the feature matching detection algorithm is different from the algorithm which is applied at edge server 108 and/or AS 104. For instance, the feature matching detection algorithm applied by device 132 may comprise an (ORB) oriented (FAST) features from accelerated segment test and rotated (BRIEF) binary robust independent elementary features algorithm. For example, the ORB algorithm may be more suited for application on mobile computing devices, e.g., as compared to SIFT, SURF, or the like. Continuing with the present example, since device 132 has exchanged information with device 133, the cache of device 132 may now include visual information of painting 161 and the associated annotation content. As such, the application of the feature matching detection algorithm by device 132 may result in a detected match/cache hit. Accordingly, device 132 may then present the associated annotation content via the device 132.

Although the present example has assumed that device 132 possesses the visual information and associated annotation content of painting 161 in the local cache of device 132, in the event that there is a cache miss, e.g., no match with the local cache, the device 132 may forward the recognition request to the centralized server, AS 104. Thus, while edge server 108 may be overloaded or unavailable, mobile computing devices, such as device 132, may enter local caching mode. Initially, an attempt is made to recognize items in captured visual information locally via application of the feature matching detection algorithm in accordance with the local cache. When there is no match, the centralized server, AS 104, may be used a secondary resource. In this way, the load on AS 104 may also be reduced by opportunistically using local caching. It should be noted that in the case of a SEAR system for a museum, there may be many more users and the reach of non-cellular wireless communication modalities for device-to-device sharing may be greater than a single room. Thus, the mobile computing devices of various users may fill local caches with a significant number of entries relating to possible items of interest in the museum. Accordingly, the number of requests being serviced by AS 104 may be significantly reduced.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 106, or may be provided by AS 104 in conjunction with server 106. For instance, AS 104 and server 106 may be configured in a load balancing arrangement, or may be configured to provide for backups or redundancies with respect to each other, and so forth.

In one example, the system 100 may further include wireless or wired connections to sensors, radio frequency identification (RFID) tags, or the like from which devices may determine locations/positions, ranges/distances, bearings, and so forth within a physical environment. In addition, in one example, location information from these sensors, tags, etc., and/or from Global Positioning System (GPS) location information of users' mobile computing devices may be used to reduce the search space for recognition results regarding items of interest. For example, in addition to visual information and associated annotation content for items of interest, the respective caches and/or database(s) of device 132, device 133, edge server 108, AS 104, and/or server 106 may also store location information of the respective items. When submitting recognition requests, devices 132 and 133 may also include location information. Accordingly, when applying feature matching detection algorithm, whether by the edge server 108, AS 104, server 106, and/or the device 132 or 133, the performing device may reduce the search space of the cache and/or database to those entries having a locational relevance. For instance, if device 132 or 133 can be localized to a particular room, only items of interest for which the respective entries indicate a location in the room may be analyzed via the feature matching detection algorithm. Similarly, if device 132 or 133 can be localized to a particular wing or floor of the museum, then only items for which the respective entries indicate a location on the same wing or floor may be considered via the feature matching detection algorithm. Thus, these and other modifications are all contemplated within the scope of the present disclosure.

FIG. 2 illustrates a flowchart of an example method 200 for obtaining, by a mobile computing device, annotation content and visual information associated with a first item detected in visual information of a first location from a first server and sharing the annotation content and visual information of the first item with an additional mobile computing device, in accordance with the present disclosure. In one example, the method 200 is performed by a component of the system 100 of FIG. 1, such as by one of devices 132 or 133, and/or any one or more components thereof (e.g., a processor, or processors, performing operations stored in and loaded from a memory), or by either of such devices in conjunction with one or more other devices, such as the other one of the devices 132 or 133, edge server 108, AS 104 or server 106, and so on. In one example, the steps, functions, or operations of method 200 may be performed by a computing device or system 400, and/or processor 402 as described in connection with FIG. 4 below. For instance, the computing device or system 400 may represent any one or more components of the system 100 of FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 400 may collectively function as a processing system. For illustrative purposes, the method 200 is described in greater detail below in connection with an example performed by a processing system. The method 200 begins in step 205 and proceeds to step 210.

At step 210, the processing system (e.g., of a mobile computing device) captures visual information of a first location. The visual information of the first location may be captured via a camera of the mobile computing device and may comprise an entire captured image or scene (e.g., a point cloud), or multiple images or scenes. In another example, the processing system may apply an object detection algorithm to identify one or more objects in the captured image(s) or scene(s).

At optional step 215, the processing system may determine whether a first server (e.g., an "edge server" of an AR system) is available. For instance, the processing system may transmit a request to confirm the availability of the first server and may receive a negative reply or may receive no reply within a timeout time period. In another example, the first server may transmit an instruction to the mobile computing device to enter a local caching mode (thereby indicating the unavailability of the first server to process a recognition request). The instruction may be transmitted proactively upon the first server detecting that a server load has exceeded or is anticipated to exceed a load threshold, or may be transmitted in response to a request from the processing system to confirm availability (and when such a load condition is determined to exist). When the first server is not available, the method 200 may proceed to optional step 265. Otherwise, when the first server is available, the method 200 may proceed to step 220.

At step 220, the processing system transmits a recognition request to the first server, the recognition request comprising the visual information of the first location. In one example, the visual information may comprise an entire captured image or scene (e.g., a point cloud), or multiple images or scenes. In another example, the visual information may comprise features associated with one or more objects that have been detected in the captured image(s) or scene(s). For example, the processing system may apply an object detection algorithm to captured image(s) or scene(s) to detect one or more objects of interest, e.g., without any knowledge of what those objects are, where the first server may be tasked with providing recognition results (if the object(s) match to any items of interest of the AR system). In an example where optional step 215 is performed, the method 200 may proceed to step 230 following step 220. Otherwise, in an example where optional step 215 is not performed, the method 200 may proceed to optional step 225.

At optional step 225, the processing system determines if the first server is available. For instance, in response to the recognition request sent at step 220, the first server may send a response declining to process the request, which may be received by the processing system. Alternatively, the processing system may detect that the mobile computing device has not received an acknowledgement from the first server within a designated timeout time period. In another example, the first server may transmit an instruction to the mobile computing device (e.g., to the processing system) to enter a local caching mode. In one example, the instruction may be specific to the mobile computing device. In another example, the instruction may be sent to a plurality of mobile computing devices that are participating in an AR experience provided by the AR system. In one example, the instruction may be transmitted proactively upon the first server detecting that the load has exceeded or is anticipated to exceed the load threshold. In another example, the instruction may be transmitted in response to the submission of a recognition request at step 220. When it is determined at optional step 225 that the first server is unavailable, the method 200 may proceed to step 265. Otherwise, the method 200 may proceed to step 230.

At step 230, the processing system obtains a first recognition result from the first server, the first recognition result comprising first annotation content associated with a first item in the visual information of the first location, the first recognition result further comprising visual information of the first item. For instance, the first item may be detected in the visual information of the first location by the first server based upon the visual information of the first item. To illustrate, the first server may store the visual information of the first item with the first annotation content, e.g., in response to a previous recognition request from another mobile computing device (a "second" additional mobile computing device). For instance, the first server may have stored the visual information of the first item with the first annotation content in response to a previous recognition request from a second additional mobile computing device, e.g., where the previous recognition request resulted in a cache miss at the first server, and the first server obtained the visual information of the first item and the first annotation content from a second server (e.g., a centralized server). In one example, the second server may comprise and/or have access to a first database containing entries comprising visual information of a first plurality of items and associated first annotation contents, while the first server may access and/or comprise a second database (or "cache") containing entries comprising visual information of a second plurality of items and associated second annotation contents (e.g., where the second plurality of items comprises a subset of the first plurality of items, the second plurality of items being items for which the first server has previously provided recognition results to one or more mobile computing devices).

Assuming that the first server is in possession of an entry associated with the first item, the first server may match at least a portion of the visual information of the first location to at least a portion of the visual information of the first item that is stored at the first server. To illustrate, the first item may be detected in the visual information of the first location by the first server based upon the visual information of the first item via a feature matching detection algorithm. In one example, the feature matching detection algorithm may comprise a scale-invariant feature transform (SIFT) with a Gaussian mixture model (GMM) algorithm.

In this regard, it should be noted that the visual information of the first item may comprise one or more images of the first item, and may alternatively or additionally include a feature set derived from one or more images of the item. For instance, for each item of interest in an AR experience (e.g., in a SEAR system), the first server may store a respective scale-invariant feature transform (SIFT) model, or a similar feature set derived from image(s) of the item, which may be used for detecting the item in other visual information (e.g., in the visual information of the first location) via feature matching. In this regard, it should also be noted that a feature set (e.g., the visual information) of the first item may include information to characterize three-dimensional properties of the first item, such as its shape, appearance from different viewing perspectives, etc. However, the visual information of the first location may not necessarily be in the same format. For instance, the processing system may capture a scene (e.g., a point cloud) of a room in a museum, but this scene may provide incomplete visual information regarding an object (such as a sculpture) that has not been viewed/captured from a variety of angles. In another example, the visual information of the first location may comprise a two-dimensional image captured from a particular camera pose, e.g., a viewport. Nevertheless, the feature matching detection algorithm may derive a feature set from the visual information of the first location that is available, and may then perform matching with regard to features sets characterizing different items of interest to the AR system having information stored at the first server.

In another example, if the first server is not in possession of an entry associated with the first item, the first server (e.g., an edge server) may forward the recognition request to the second server (e.g., a centralized server), obtain a recognition result from the second server, and forward the recognition result to the processing system and/or mobile computing device, which may be received at step 230. The second server may apply a similar feature matching detection algorithm as described above with regard to the first server, but may utilize a larger database comprising entries relating to the first plurality of items (e.g., all of the items of interest in the AR system). It should be noted that the communications between the mobile computing device and/or processing system and the first server may involve cellular communication via one or more base stations, and may alternatively or additionally involve a non-cellular wireless communication modality, such as IEEE 802.11/Wi-Fi, or the like. For instance, the mobile computing device may be connected to a wireless local area network (WLAN) containing at least one wireless access point that provides further access to the Internet in general, and to the first server in particular.

At step 235, the processing system presents at least a portion of the first annotation content via the mobile computing device. For instance, the first annotation content may be presented as a visual overlay over the visual information of the first location via the mobile computing device, e.g., via a display, a projector, or the like. The first annotation content may also be presented as a haptic output via the mobile computing device and/or an audio output via the mobile computing device (e.g., depending upon the particular composition of the first annotation content, depending upon the capabilities of the processing system and/or mobile computing device, depending upon user preferences, etc.).

At step 240, the processing system stores the first annotation content and the visual information of the first item (e.g., in an entry/record) in a local cache of the mobile computing device.

At step 245, the processing system detects a (first) additional mobile computing device via a non-cellular wireless communication modality (e.g., via an IEEE 802.11 or 802.15 communication, or the like). It should be noted that the detection may specifically be among mobile computing devices that are participants in a collaborative AR system (e.g., SEAR) and which have been configured to allow such connections to other mobile devices for the specific purpose of sharing information of the AR system.

At step 250, the processing system shares the first annotation content and the visual information of the first item with the (first) additional mobile computing device via the non-cellular wireless communication modality.

At optional step 255, the processing system may obtain visual information of another, second item and second annotation content associated with the second item from the (first) additional mobile computing device or from a (second) additional mobile computing device via the non-cellular wireless communication modality. In one example, the second additional mobile computing device may be detected similarly to the first additional mobile computing device, e.g., in accordance with step 245. In addition, the second additional mobile computing device may be the same or different from the second additional mobile computing device mentioned in connection with step 230. In this regard, it should also be noted that although the terms, "first," "second," "third," etc., may be used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," do not imply a particular number of those items corresponding to those numerical values. In addition, the use of the term "third" for example, does not imply a specific sequence or temporal relationship with respect to a "first" and/or a "second" of a particular type of item, unless otherwise indicated.

At optional step 260, the processing system may store the visual information of the second item and the second annotation content in the local cache of the mobile computing device. Following step 250, or either or both of optional steps 255 and 260, the method 200 may proceed to optional step 280.

At optional step 280, the processing system may determine whether to continue. For instance, the method 200 may run on a continuous basis until a user closes an AR application associated with the method 200, until the mobile computing device is outside of a geographic limit associated with an AR experience, until the mobile computing device is shut down or one or more networking services are disabled, and so forth. When it is determined to continue, the method 200 may return to step 210 or to step 245. Otherwise, the method 200 may proceed to step 295.

At step 295, the method 200 ends.

To further illustrate aspects of the present disclosure and more particularly the method 200, in one example it may be assumed that the method 200 returns to step 210 following optional step 280. At step 210, the processing system may then capture visual information of a second location. For instance, this subsequent iteration of step 210 may be similar to the operations described above, but with respect to another location (e.g., in a different room of a museum, such as in accordance with the example of FIG. 1).

Following step 210, the processing system may then determine that the first server is unavailable. In one example, the determination may be in accordance with optional step 215. In another example, the determination may be in accordance with optional step 225, e.g., following a performance of step 220 to send a second recognition request to the first server. In either case, due to the unavailability of the first server, the method 200 may proceed to optional step 265.

At optional step 265, the processing system may apply a feature matching detection algorithm to the visual information of the second location in accordance with the local cache of the mobile computing device. For instance, the feature matching detection algorithm may be different from the algorithm which is applied by the first server and may comprise an (ORB) oriented (FAST) features from accelerated segment test and rotated (BRIEF) binary robust independent elementary features algorithm. In one example, the feature matching detection algorithm may further include a detection module, e.g., a cosine-matrix distance-based detector, a Laplacian-based detector, a Hessian matrix-based detector, a fast Hessian detector, etc. In one example, optional step 265 may comprise converting image and/or scene data comprising the visual information of the second location into a feature set that can be used for match detection to visual information of one or more items stored in the local cache.

At optional step 270, the processing system may detect the second item in the visual information of the second location via the feature matching algorithm in accordance with the visual information of the second item that is stored in the local cache. For instance, as described above, and in one example, an iteration of the method 200 may have resulted in the processing system storing visual information (and associated annotation content) of the second item in the local cache, after having been received from one of the additional mobile computing devices (e.g., at optional steps 255 and 260).

At optional step 275, the processing system may present at least a portion of the second annotation content via the mobile computing device, in response to detecting the second item in the visual information of the second location. For instance, optional step 275 may comprise the same or similar operations as described above in connection with step 235. Following optional step 275, the method 200 may again proceed to optional step 280 to determine whether to continue and proceed back to step 210 or step 245, or to end and proceed to step 295.

It should be noted that the method 200 may be expanded to include additional steps, or may be modified to replace steps with different steps, to combine steps, to omit steps, to perform steps in a different order, and so forth. For instance, in one example the processor may repeat one or more steps of the method 200, such as steps 210-280 for visual information of the same or different locations. In another example, the method 200 may include obtaining location information of the mobile computing device (e.g., via a GPS component of the processing system and/or the mobile computing device, via beacon or tag sensing, etc.) and transmitting the location information the first server (e.g., to allow the first server to reduce the search space for items of the AR system that may be geographically relevant).

In another example, the method 200 may be expanded to include additional and/or alternative operations in connection with and/or following optional step 270. For instance, upon a cache miss at optional step 270 in local caching mode (when the first server is determined to be unavailable), the processing system may transmit a recognition request to a second server (e.g., a centralized server) which may perform similar operations as the first server. In still another example, there may be multiple centralized servers, e.g., in a load balancing arrangement or for redundancy/backup purposes, which may each store records/entries relating to all or a portion of the items of interest in the AR system. In another example, there may be multiple tiers or layers of first servers, each tier having databases/caches with successively more entries. In another example, there may be at least two first servers (e.g., edge servers) from which mobile computing devices may attempt to submit recognition requests and obtain recognition results before entering local caching mode. Thus, these and other modifications are all contemplated within the scope of the present disclosure.

FIG. 3 illustrates a flowchart of an example method 300 for detecting an item in visual content of a first location and providing annotation content and visual information associated with the item to a mobile computing device, in accordance with the present disclosure. In one example, the method 300 is performed by a component of the system 100 of FIG. 1, such as by edge server 108, and/or any one or more components thereof (e.g., a processor, or processors, performing operations stored in and loaded from a memory), or by edge server 108 in conjunction with one or more other devices, such as devices 132 and/or 133, AS 104 or server 106, and so on. In one example, the steps, functions, or operations of method 300 may be performed by a computing device or system 400, and/or processor 402 as described in connection with FIG. 4 below. For instance, the computing device or system 400 may represent any one or more components of the system 100 of FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and proceeds to step 310.

At step 310, the processing system (e.g., of a first server, such as an edge server) obtains a first recognition request from a first mobile computing device, the first recognition request comprising visual information of a first location.

At optional step 315, the processing system may determine whether a load of the first server exceeds a threshold. When the first server load exceeds the threshold (such as 85 percent utilization of processor and/or memory resources, 90 percent utilization, etc.), or is otherwise unavailable, the method 300 may proceed to optional step 350. Otherwise, when the load is not excessive (does not exceed the threshold), the method 300 may proceed to step 320.

At step 320, the processing system, applies a feature matching detection algorithm to the visual information of the first location in accordance with a cache of the first server, where the cache, or database, contains entries comprising visual information of a plurality of items and associated annotation contents. For instance, the feature matching detection algorithm may comprise a SIFT with GMM algorithm, or a similar algorithm, such as SURF. In one example, the feature matching detection algorithm may include a detection module, e.g., a cosine-matrix distance-based detector, a Laplacian-based detector, a Hessian matrix-based detector, a fast Hessian detector, etc., and so forth.

At step 325, the processing system determines whether a first item of the plurality of items in the visual information of the first location is detected via the feature matching detection algorithm in accordance with visual information of the first item contained in the cache. When the first item is detected, the method 300 may proceed to step 330. Otherwise, when the first item is not detected (e.g., when there is a cache miss and no item of interest in the AR system is detected via the first server cache), the method 300 may proceed to optional step 335.

At step 330, the processing system may provide a first recognition result associated with the first item to the first mobile computing device, e.g., in response to the detection/positive determination at step 325. For instance, the first recognition result may comprise the visual information of the first item and first annotation content that is associated with the first item, which may be stored in a record/entry in the cache of the first server. Following step 330, the method 300 may proceed to step 355.

At step 355, the processing system determines whether to continue. For instance, the method 300 may run on a continuous basis until a user turns off the first server, until a network disruption is detected, until a subscription period for the first server expires (e.g., where the first server may be hosted by a telecommunication network service provider on behalf of a third-party providing an AR system/experience to users, such as an edge server), and so forth. When it is determined to continue, the method 300 may return to step 310. Otherwise, the method 300 may proceed to step 395.

At step 395, the method 300 ends.

To further illustrate aspects of the present disclosure and more particularly the method 300, in one example it may be assumed that the method 300 returns to step 310 following optional step 355.

At step 310, the processing system may obtaining a second recognition request from the first mobile computing device or a second mobile computing device, the second recognition request comprising visual information of a second location.

In one example, at optional step 315, the processing system may then determine that the first server load exceeds the threshold. In such case, the method 300 may proceed to optional step 350. At optional step 350, the processing system may direct the first mobile computing device or the second mobile computing device to process the second recognition request in accordance with a local cache of the first mobile computing device or the second mobile computing device. For instance the local caching mode is described above in connection with optional steps 265-275 of the example method 200, and elsewhere herein. In addition, as further described above in connection with steps 245-260 of the example method 200, the first mobile computing device and the second mobile computing device may exchange visual information of one or more items and annotation contents associated with the one or more items that are stored in respective local caches of the first mobile computing device and the second mobile computing device via a non-cellular wireless communication modality. Following optional step 350, the method 300 may again return to optional step 355 to determine whether to continue and proceed back to step 310, or to end and proceed to step 395.

If, however, it is determined at optional step 315 that the first server is not overloaded and remains available, the method 300 may again proceed to step 320. For illustrative purposes, it may be assumed that at this subsequent iteration of step 320 there is a cache miss at the first server (determined at step 325). In other words, the processing system may apply (at step 320) the feature matching detection algorithm to the visual information of the second location in accordance with the cache of the first server, and may determine (at step 325) that the visual information of a second location does not contain a match to any of the visual information of the plurality of items contained in the cache. Upon the cache miss, the method 300 may then proceed to optional step 335.

At optional step 335, the processing system may forward the second recognition request to a second server (e.g., a centralized server).

At optional step 340, the processing system may obtain a second recognition result from the second server, the second recognition result comprising information associated with a second item in the visual information of the second location, e.g., where the second item is detected in the visual information of the second location by the second server. Notably, the second server may process the recognition request by similarly applying a feature matching detection algorithm (e.g., a same or different algorithm as that which was applied by the processing system at step 320). However, the second server may comprise or may access a database with entries/records for a larger number of items of interest in the AR system (e.g., all items of interest) as compared to the number of items for which entries/records are stored at the cache of the first server. For instance, the first server may store entries for those items for which an associated recognition result has previously been provided to requesting mobile computing devices.

At optional step 345, the processing system may store the information associated with the second item in a cache of the first server. For instance, each time the first server forwards a recognition request to the second server (upon a cache miss at the first server), when there is a match made by the second server, visual information of an item and associated annotation content may be returned as a recognition result, and the edge cache may store such information as a record in the cache of the first server. Accordingly, the stored entry/record may be used in subsequent iterations of the method 300 at steps 320 and 325, thereby increasing the chances of detecting an item of interest in visual information of a location that is received.

Following optional step 345, the method 300 may again proceed to step 330 to provide the recognition result to the requesting first mobile computing device or second mobile computing device. In addition, following this subsequent iteration of the step 330, the method 300 may again return to optional step 355 to determine whether to continue and proceed back to step 310, or to end and proceed to step 395.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300, such as steps 310-330, steps 310-355, etc. In another example, the method 300 may include obtaining location information of the mobile computing device and reducing the search space at step 325 for items of the AR system that may have geographic/locational relevance. In still another example, there may be multiple second servers (e.g., centralized servers), such as in a load balancing arrangement or for redundancy/backup purposes, which may each store records/entries relating to all or a portion of the items of interest in the AR system. In another example, there may be multiple tiers or layers of first servers (e.g., edge servers), each tier having databases/caches with successively more entries. In another example, there may be at least two edge servers from which mobile computing devices may attempt to submit recognition requests and obtain recognition results before entering local caching mode. In such an example, when the processing system of the first server (e.g., an edge sever) performing the method 300 detects that it is overloaded, the first server may alternatively or additionally direct one or more mobile computing devices to another edge server, e.g., as a possible option instead of immediately entering local caching mode. Thus, these and other modifications are all contemplated within the scope of the present disclosure.

In addition, although not expressly specified above, one or more steps of the method 200 or the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1, or described in connection with the method 200 of FIG. 2 or the method 300 of FIG. 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for obtaining, by a mobile computing device, annotation content and visual information associated with a first item detected in visual information of a first location from a first server and sharing the annotation content and visual information of the first item with an additional mobile computing device or for detecting an item in visual content of a first location and providing annotation content and visual information associated with the item to a mobile computing device, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA) including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for obtaining, by a mobile computing device, annotation content and visual information associated with a first item detected in visual information of a first location from a first server and sharing the annotation content and visual information of the first item with an additional mobile computing device or for detecting an item in visual content of a first location and providing annotation content and visual information associated with the item to a mobile computing device (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for obtaining, by a mobile computing device, annotation content and visual information associated with a first item detected in visual information of a first location from a first server and sharing the annotation content and visual information of the first item with an additional mobile computing device or for detecting an item in visual content of a first location and providing annotation content and visual information associated with the item to a mobile computing device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
capturing, by a processing system of a mobile computing device, visual information of a first location;
transmitting, by the processing system, a recognition request to a first server, the recognition request comprising the visual information of the first location;
obtaining, by the processing system, a first recognition result from the first server, the first recognition result comprising first annotation content associated with a first item in the visual information of the first location, the first recognition result further comprising a model of the first item that is derived from visual information of the first item, wherein the first item is detected in the visual information of the first location by the first server based upon the model of the first item;
presenting, by the processing system, at least a portion of the first annotation content via the mobile computing device;
storing, by the processing system, the first annotation content and the model of the first item in a local cache of the mobile computing device;
detecting, by the processing system, a first additional mobile computing device via a non-cellular wireless communication modality; and
sharing, by the processing system, the first annotation content and the model of the first item with the first additional mobile computing device via the non-cellular wireless communication modality.

2. The method of claim 1, further comprising:
verifying, by the processing system, an availability of the first server to process the recognition request.

3. The method of claim 1, wherein the first server stores the model of the first item and the first annotation content.

4. The method of claim 3, wherein the first server matches at least a portion of the visual information of the first location to at least a portion of the model of the first item that is stored at the first server.

5. The method of claim 3, wherein the first server stores the model of the first item with the first annotation content in response to a previous recognition request from a second additional mobile computing device.

6. The method of claim 5, wherein when the previous recognition request results in a cache miss at the first server, the first server obtains the model of the first item and the first annotation content from a second server.

7. The method of claim 6, wherein the second server accesses a first database containing entries comprising models of a first plurality of items and associated first annotation contents, wherein the first server accesses a second database containing entries comprising models of a second plurality of items and associated second annotation contents, wherein the second plurality of items comprises a subset of the first plurality of items.

8. The method of claim 7, wherein the second plurality of items comprises items for which the first server has provided recognition results to one or more mobile computing devices.

9. The method of claim 1, wherein the at least the portion of the first annotation content is presented as at least one of:
a visual overlay over the visual information of the first location via the mobile computing device;
a haptic output via the mobile computing device; or
an audio output via the mobile computing device.

10. The method of claim 1, wherein the first item is detected in the visual information of the first location by the first server based upon the model of the first item via a feature matching detection algorithm.

11. The method of claim 10, wherein the feature matching detection algorithm comprises a scale-invariant feature transform with a gaussian mixture model algorithm.

12. The method of claim 1, further comprising:
obtaining, by the processing system, a model of a second item and second annotation content associated with the second item from the first additional mobile computing device or from a second additional mobile computing device via the non-cellular wireless communication modality; and
storing, by the processing system, the model of the second item and the second annotation content in the local cache of the mobile computing device.

13. The method of claim 12, further comprising:
capturing, by the processing system, visual information of a second location;
determining, by the processing system, that the first server is unavailable;
applying, by the processing system, a feature matching detection algorithm to the visual information of the second location in accordance with the local cache;
detecting, by the processing system, the second item in the visual information of the second location via the feature matching algorithm in accordance with the model of the second item that is stored in the local cache; and
presenting, by the processing system, at least a portion of the second annotation content via the mobile computing device, in response to the detecting the second item in the visual information of the second location.

14. An apparatus comprising:
a processing system including at least one processor; and
a computer-readable medium storing instructions which, when executed by the processing system, cause the processing system to perform operations, the operations comprising:
capturing visual information of a first location;
transmitting a recognition request to a first server, the recognition request comprising the visual information of the first location;
obtaining a first recognition result from the first server, the first recognition result comprising first annotation content associated with a first item in the visual information of the first location, the first recognition result further comprising a model of the first item that is derived from visual information of the first item, wherein the first item is detected in the visual information of the first location by the first server based upon the model of the first item;
presenting at least a portion of the first annotation content via the mobile computing device;
storing the first annotation content and the model of the first item in a local cache of the mobile computing device;
detecting a first additional mobile computing device via a non-cellular wireless communication modality; and
sharing the first annotation content and the model of the first item with the first additional mobile computing device via the non-cellular wireless communication modality.

15. A method comprising:
obtaining, by a processing system of a first server including at least one processor, a first recognition request from a first mobile computing device, the first recognition request comprising visual information of a first location;
applying, by the processing system, a feature matching detection algorithm to the visual information of the first location in accordance with a cache of the processing system, wherein the cache contains:
entries comprising a plurality of models of a plurality of items derived from visual information of the plurality of items; and
associated annotation contents;
detecting, by the processing system, a first item of the plurality of items in the visual information of the first location via the feature matching detection algorithm in accordance with a model of the first item contained in the cache, the model of the first item comprising one of the plurality of models; and
providing, by the processing system, a first recognition result associated with the first item to the first mobile computing device, the first recognition result comprising the model of the first item and first annotation content that is associated with the first item.

16. The method of claim 15, further comprising:
obtaining, by the processing system, a second recognition request from the first mobile computing device or a second mobile computing device, the second recognition request comprising visual information of a second location;
applying, by the processing system, the feature matching detection algorithm to the visual information of the second location in accordance with the cache;
determining, by the processing system, that the visual information of the second location does not contain a match to any of the plurality of models of the plurality of items contained in the cache; and
forwarding, by the processing system, the second recognition request to a second server.

17. The method of claim 16, further comprising:
obtaining, by the processing system, a second recognition result from the second server, the second recognition result comprising information associated with a second item in the visual information of the second location, wherein the second item is detected in the visual information of the second location by the second server; and
providing, by the processing system, the second recognition result to the first mobile computing device or the second mobile computing device.

18. The method of claim 15, further comprising:
obtaining, by the processing system, a second recognition request from the first mobile computing device or a second mobile computing device, the second recognition request comprising visual information of a second location;

determining, by the processing system, that a load of the processing system exceeds a threshold; and directing, by the processing system, the first mobile computing device or the second mobile computing device to process the second recognition request in accordance with a local cache of the first mobile computing device or the second mobile computing device.

19. The method of claim 18, wherein the first mobile computing device and the second mobile computing device exchange models of one or more items and annotation contents associated with the one or more items that are stored in respective local caches of the first mobile computing device and the second mobile computing device via a non-cellular wireless communication modality.

20. The method of claim 15, wherein the feature matching detection algorithm comprises a scale-invariant feature transform with a gaussian mixture model algorithm.

* * * * *